(12) United States Patent
Jiang et al.

(10) Patent No.: US 11,625,440 B2
(45) Date of Patent: Apr. 11, 2023

(54) AUTOMATING IMPLEMENTATION OF TAXONOMIES

(71) Applicant: Meta Platforms, Inc., Menlo Park, CA (US)

(72) Inventors: Jiayan Jiang, San Jose, CA (US); Yaron Fidler, San Jose, CA (US); Ching-Chih Weng, Union City, CA (US); Emily Klebanoff, San Francisco, CA (US); Philip Hui Li, San Jose, CA (US); Aniruddha Ramakant Kortikar, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 890 days.

(21) Appl. No.: 15/624,452

(22) Filed: Jun. 15, 2017

(65) Prior Publication Data
US 2018/0365326 A1     Dec. 20, 2018

(51) Int. Cl.
*G06F 16/00* (2019.01)
*G06F 16/951* (2019.01)
*G06F 16/28* (2019.01)
*G06F 16/958* (2019.01)

(52) U.S. Cl.
CPC .......... *G06F 16/951* (2019.01); *G06F 16/282* (2019.01); *G06F 16/958* (2019.01)

(58) Field of Classification Search
CPC ..... G06F 16/951; G06F 16/282; G06F 16/958
See application file for complete search history.

(56) References Cited

U.S. PATENT DOCUMENTS

| | | | |
|---|---|---|---|
| 8,954,440 B1 * | 2/2015 | Gattani | G06F 16/93 707/738 |
| 2011/0213655 A1 * | 9/2011 | Henkin et al. | G06Q 30/0251 705/14.49 |

(Continued)

OTHER PUBLICATIONS

Glassification, Taxonomies and You, Verity, Inc., Jul. 2004, 15 pages.

(Continued)

*Primary Examiner* — Paul Kim
(74) *Attorney, Agent, or Firm* — Kilpatrick Townsend & Stockton LLP

(57) ABSTRACT

The present disclosure relates generally to taxonomies. More particularly, techniques are described for receiving a taxonomy as input, automatically generating data structures representing the taxonomy, determining content that is relevant to different concepts of the taxonomy, and generating an interface that enables users to access and navigate through the taxonomy-related content. The taxonomy specification may specify a taxonomy for a domain including various concepts related to the domain and hierarchical relationships between the concepts. Based on the taxonomy specification, a taxonomy structure may be generated for the taxonomy, the taxonomy structure including multiple taxonomy nodes corresponding to the multiple concepts. Content stored by a social networking system (SNS) may be searched to identify content relevant to each taxonomy node. Using relevant content identified, multiple web pages may be built with for the multiple taxonomy nodes in the taxonomy structure.

19 Claims, 11 Drawing Sheets

(56) References Cited

U.S. PATENT DOCUMENTS

2013/0246328 A1* 9/2013 Sweeney .............. G06N 5/02
　　　　　　　　　　　　　　　　　　　　　　706/50
2014/0222807 A1　8/2014 Lee et al.

OTHER PUBLICATIONS

Walli, Betsy. Taxonomy 101: The Basics and Getting Started with Taxonomies, Available online at: http://www.kmworld.com/Articles/Editorial/What-Is/Taxonomy-101-The-Basics-and-Getting-Started-with-Taxonomies-98787.aspx, Aug. 15, 2014, 4 pages.

* cited by examiner

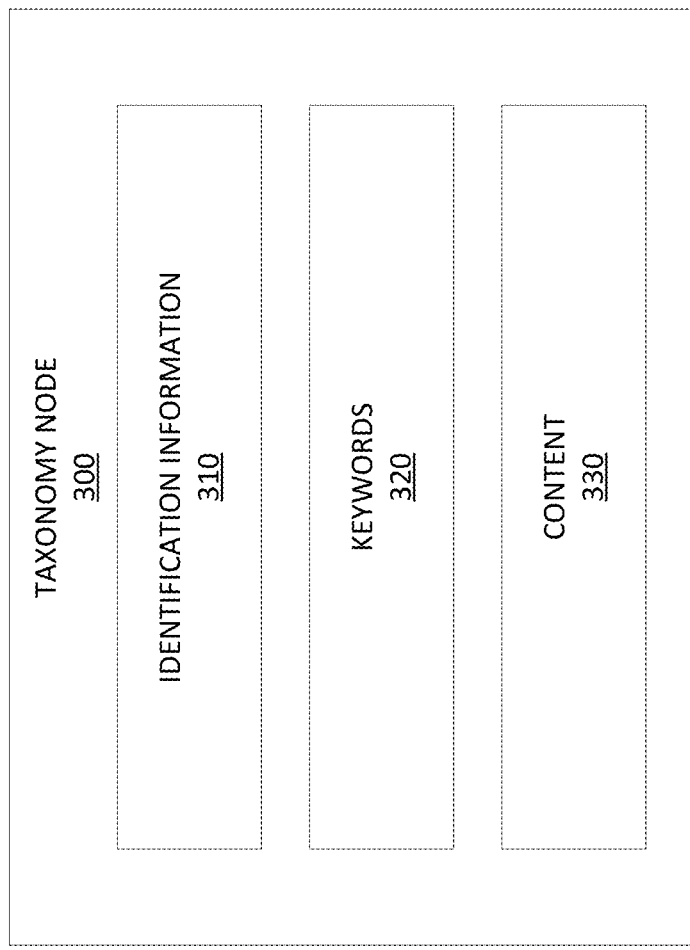

AUTOMATING IMPLEMENTATION OF TAXONOMIES

BACKGROUND

A taxonomy provides a structure or template for organizing information for a particular domain. A taxonomy for a domain includes a hierarchical structuring of concepts from generic ones to more specific ones. A taxonomy for a domain is generally defined by a domain expert. However, even after a taxonomy has been defined, using the taxonomy for a practical application is very difficult. For example, the tasks of implementing a workable version of the taxonomy, determining data to be associated with different concepts within a taxonomy, providing access to the taxonomy information, etc., are all complex tasks that are typically performed manually by data scientists. As a result, the use of taxonomies is restricted to and outside the realm of a common non-technical user.

SUMMARY

The present disclosure relates generally to taxonomies. More particularly, techniques are described for receiving a taxonomy as input, automatically generating data structures representing the taxonomy, determining content that is relevant to different concepts of the taxonomy, and generating an interface that enables users to access and navigate through the taxonomy-related content.

Various inventive embodiments are described herein, including methods, systems, non-transitory computer-readable storage media storing programs, code, or instructions executable by one or more processors, and the like. For example, a taxonomy specification may be received as input from a user. The taxonomy specification may specify a taxonomy for a domain including various concepts related to the domain and hierarchical relationships between the concepts. The taxonomy specification may also specify one or more keywords associated with the multiple concepts.

Based on the taxonomy specification, a taxonomy structure may be generated for the taxonomy, the taxonomy structure including multiple taxonomy nodes corresponding to the multiple concepts. For each taxonomy node in a set of taxonomy nodes included in the multiple taxonomy nodes, a set of one or more keywords associated with the taxonomy node may be determined. The set of one or more keywords can be used to search content stored by a social networking system (SNS) to identify content relevant to the taxonomy node. Content returned by the search may then be associated with a taxonomy node associated with a keyword used. The search of the SNS may be performed by a search engine of the SNS.

In certain embodiments, multiple web pages may be built for the multiple taxonomy nodes in the taxonomy structure, the multiple web pages including a first web page for a first taxonomy node in the multiple taxonomy nodes, the first web page including a portion of content associated with the first taxonomy node, the first web page including a set of one or more links for accessing one or more web pages from the multiple web pages associated with one or more other taxonomy nodes in the plurality of taxonomy nodes. In some embodiments, information may be sent to a user, the information enabling the user to access the multiple web pages.

In some embodiments, the first taxonomy node may be a child of a second taxonomy node. In such embodiments, the web page for the first taxonomy node may include a link to a web page for the second taxonomy node. In certain embodiments, the multiple web pages may be updated periodically based on additional searches using the set of one or more keywords.

In some embodiments, a first keyword associated with a first concept in the multiple concepts may be identified from the taxonomy structure. The first keyword may be used to identify a second keyword that is not already associated with the first concept. Identifying the second keyword may include determining the second keyword based on a set of one or more documents returned in response to a search performed using the first keyword. In such embodiments, the first keyword and the second keyword may be associated with a taxonomy node in the multiple taxonomy nodes corresponding to the first concept.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures:

FIG. 3A depicts an example of a taxonomy node according to certain embodiments;

DETAILED DESCRIPTION

Figure 1:
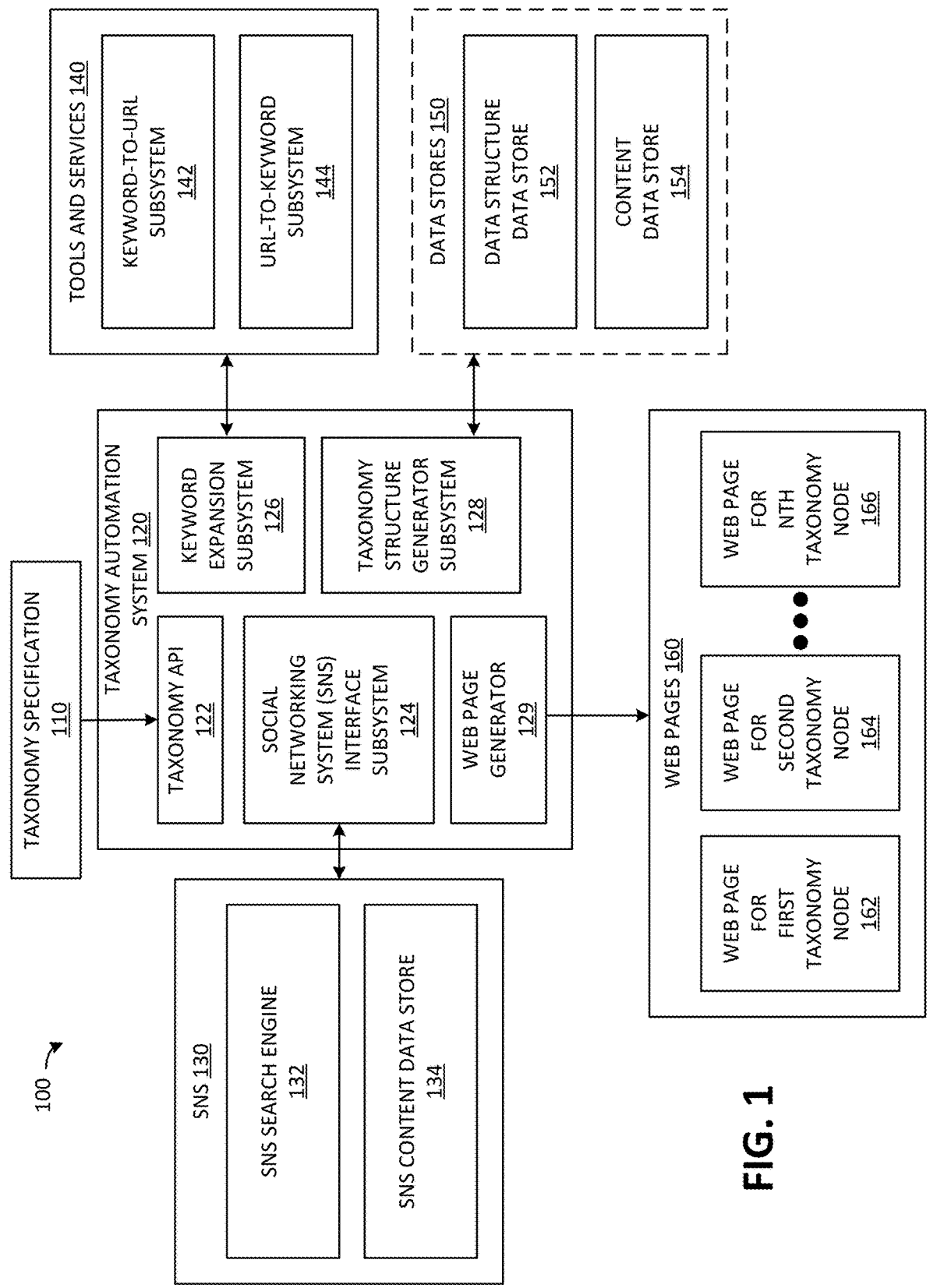
FIG. 1 depicts a system for automating the implementation of taxonomies according to certain embodiments.

In the following description, for the purposes of explanation, specific details are set forth in order to provide a thorough understanding of examples of the disclosure. However, it will be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may be shown without necessary detail in order to avoid obscuring the examples. The figures and description are not intended to be restrictive.

The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some embodiments, the systems may be configured as a distributed system where one or more components of the system are distributed across one or more networks such as in a cloud computing system.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

A taxonomy provides a structure or template for organizing information for a particular domain. A taxonomy for a domain comprises a hierarchical structuring of concepts from generic ones to more specific ones that break down concepts of the given domain. The present disclosure describes techniques for, in response to receiving a taxonomy as input, automatically generating data structures for implementing the taxonomy, determining content that is relevant to different concepts of the taxonomy, and generating an interface that enables users to access and navigate through the taxonomy-related content. In certain embodiments, the relevant content may be identified from content stored by a social networking system (SNS).

The SNS may enable its users to interact with and share content with each other through various interfaces provided by the SNS. The content may include, for example, posts, web pages, events, photos, audiovisual content (e.g., videos), apps, or the like. The SNS may store the content such that users may navigate to the content. However, SNSs are always looking for new services to provide their users to enhance the user experience within the SNSs.

The present disclosure relates generally to taxonomies. More particularly, techniques are described for receiving a taxonomy as input, automatically generating data structures representing the taxonomy, determining content that is relevant to different concepts of the taxonomy, and generating an interface that enables users to access and navigate through the taxonomy-related content.

Various inventive embodiments are described herein, including methods, systems, non-transitory computer-readable storage media storing programs, code, or instructions executable by one or more processors, and the like. For example, a taxonomy specification may be received as input from a user. The taxonomy specification may specify a taxonomy for a domain including various concepts related to the domain and hierarchical relationships between the concepts. For example, some concepts included in the taxonomy may be related to a common other concept (sometimes referred to as being siblings) and other concepts may be related directly to each other (sometimes referred to as a parent-child relationship).

The taxonomy specification may also specify one or more keywords associated with the multiple concepts. For example, a concept such as barbeque pork may have keywords barbeque pork recipes and char sui recipes. Example formats of the taxonomy specification may include a comma-delimited file, a text document, or the like). The taxonomy specification may be received by a system, such as a taxonomy automation system. The taxonomy automation system may be included with, or remote from, the SNS.

Based on the taxonomy specification, a taxonomy structure may be generated for the taxonomy, the taxonomy structure including multiple taxonomy nodes corresponding to the multiple concepts. For example, the taxonomy structure may be a directed acyclic graph (DAG) including a root node and nodes at different hierarchical levels having parent-child relationships. In certain embodiments, the taxonomy specification may be defined and input by the SNS. In other embodiments, the taxonomy specification may be input by a third party not associated with the SNS. In other embodiments, the taxonomy specification may be defined and provided using natural language processing-based techniques, machine learning-based techniques, or other automated or semi-automated techniques.

For each taxonomy node in a set of taxonomy nodes included in the multiple taxonomy nodes, a set of one or more keywords associated with the taxonomy node may be determined. The set of one or more keywords can be used to search content stored by a SNS to identify content relevant to the taxonomy node. Examples of content from the SNS may include posts, pages, groups, events, photos, videos, apps, and the like. Content may be divided between content available in a logged-in and logged-out status. For example, some content may be available only when a user is logged into the SNS. Other content may be available even when a user is not logged into the SNS. Content returned by a search of the SNS may only be content available in a logged-out status and/or logged-in status. When content is returned that is available in a logged-in status, the content may be personalized to a user (e.g., results may be in relation to content available to the user when the user is logged in). Content returned by the search may then be associated with a taxonomy node associated with a keyword used. The search of the SNS may be performed by a search engine of the SNS.

In certain embodiments, multiple web pages may be built for the multiple taxonomy nodes in the taxonomy structure, the multiple web pages including a first web page for a first taxonomy node in the multiple taxonomy nodes, the first web page including a portion of content associated with the first taxonomy node, the first web page including a set of one or more links for accessing one or more web pages from the multiple web pages associated with one or more other taxonomy nodes in the plurality of taxonomy nodes. Examples of links may include, but is not limited to, ability to navigate between web pages associated with different taxonomy nodes of the taxonomy structure, navigate to associated content, navigate from content to a web page associated with a different taxonomy node, navigate from a web page associated with a parent taxonomy node to one or more web pages associated with the parent taxonomy node's one or more children taxonomy nodes, navigate from a web page associated with a child taxonomy node to one or more web pages associated with the child taxonomy node's one or more parent taxonomy nodes, navigate between web pages associated with sibling taxonomy nodes, and the like. In some embodiments, information may be sent to a user, the information enabling the user to access the multiple web pages.

In some embodiments, the first taxonomy node may be a child of a second taxonomy node. In such embodiments, the web page for the first taxonomy node may include a link to a web page for the second taxonomy node. In certain embodiments, the multiple web pages may be updated periodically based on additional searches using the set of one or more keywords. For example, a sports vertical may be updated after a particular time in the day or after each game played by a particular team. In other embodiments, the multiple web page may be static (i.e., do not change over time).

In certain embodiments, a keyword from a taxonomy specification may be expanded. Expanding the keyword may include determining one or more additional keywords that are related to the keyword. For example, one or more web pages associated with the keyword may be determined. For each of the one or more web pages, one or more additional keywords associated with the web page may be determined. In some embodiments, determining the one or more web pages associated with the keyword may be performed by a search engine unassociated with the SNS. In such embodiments, results of the search engine may include web pages unassociated with the SNS. However, it should be recognized that a search engine associated with the SNS may also be used. Then, the keyword and the one or more additional keywords may be associated with a taxonomy node. In other embodiments, a keyword from a taxonomy node may be expanded. In such embodiments, the process may be similar to as described above except that the one or more additional keywords may be associated with the taxonomy node as additional keywords.

FIG. 1 depicts system 100 for automating the implementation of taxonomies according to certain embodiments. System 100 may comprise multiple systems, subsystems, engines, and data stores that are communicatively coupled. In certain embodiments, the components of system 100 may be communicatively coupled to each other via one or more communication networks. System 100 depicted in FIG. 1 is merely an example and is not intended to unduly limit the scope of inventive embodiments recited in the claims. One of ordinary skill in the art would recognize many possible variations, alternatives, and modifications. For example, in some implementations, system 100 may have more or fewer systems than those shown in FIG. 1, may combine two or more systems, or may have a different configuration or arrangement of systems. For example, while in FIG. 1, social networking system (SNS) 130 is shown as being separate from taxonomy automation system 120, in some alternative embodiments, taxonomy automation system 120 may be a part of a SNS such as SNS 130.

SNS 130 may enable its users to interact with and share information with each other through various interfaces provided by SNS 130. To use SNS 130, a user typically has to register with SNS 130. As a result of the registration, SNS 130 may create and store information about the user, often referred to as a user profile. The user profile may include the user's identification information, background information, employment information, demographic information, communication channel information, personal interests, or other suitable information. Information stored by SNS 130 for a user may be updated based on the user's interactions with SNS 130 and other users of SNS 130. For example, a user may add connections to any number of other users of SNS 130 to whom they desire to be connected. The term "friend" is sometimes used to refer to any other users of SNS 130 to whom a user has formed a connection, association, or relationship via SNS 130. Connections may be added explicitly by a user or may be automatically created by SNS 130 based on common characteristics of the users (e.g., users who are alumni of the same educational institution).

SNS 130 may also store information related to the user's interactions and relationships with other concepts (e.g., users, groups, posts, pages, events, photos, audiovisual content (e.g., videos), apps, etc.) in SNS 130. SNS 130 may store the information in a social graph. The social graph may include nodes representing individuals, groups, organizations, or the like. The edges between the nodes may represent one or more specific types of interdependencies or interactions between the concepts. SNS 130 may use this stored information to provide various services (e.g., wall posts, photo sharing, event organization, messaging, games, advertisements, or the like) to its users to facilitate social interaction between users using SNS 130. In one embodiment, if users of SNS 130 are represented as nodes in the social graph, the term "friend" can refer to an edge formed between and directly connecting two user nodes.

SNS 130 can facilitate linkages between a variety of concepts, including users, groups, etc. These concepts may be represented by nodes of the social graph interconnected by one or more edges. A node in the social graph may represent a concept that can act on another node representing another concept and/or that can be acted on by the concept corresponding to the another node. A social graph may include various types of nodes corresponding to users, non-person concepts, content items, web pages, groups, activities, messages, and other things that can be represented by objects in SNS 130. An edge between two nodes in the social graph may represent a particular kind of connection, or association, between the two nodes, which may result from node relationships or from an action that was performed by a concept represented by one of the nodes on a concept represented by the other node. In some cases, the edges between nodes may be weighted. In certain embodiments, the weight associated with an edge may represent an attribute associated with the edge, such as a strength of the connection or association between nodes. Different types of edges can be provided with different weights. For example, an edge created when one user "likes" another user may be given one weight, while an edge created when a user befriends another user may be given a different weight.

SNS 130 may also store various types of content including but not limited to posts, pages, groups, events, photos, videos, apps, and other content provided by members of SNS 130. While one data store 134 is depicted in FIG. 1, this is not intended to be limiting. SNS 130 may store various types of content in one or more data stores.

In the embodiment depicted in FIG. 1, system 100 comprises a taxonomy automation system 120 that is configured to automate the implementation of a taxonomy. Taxonomy automation system 120 is configured to receive a taxonomy as input. The input taxonomy may be for some vertical domain. Examples of vertical domains include without restriction food recipes, travel destinations, corporate structure, a particular industry, and the like. In response to receiving a taxonomy as input, taxonomy automation system 120 is configured to automatically generate data structures for implementing the taxonomy. Taxonomy automation system 120 may further search a corpus of content to identify content that is relevant to different concepts of the taxonomy. In certain embodiments, content associated with and stored by SNS 130 is searched to identify content that is relevant to the taxonomy concepts. Taxonomy automation system 120 is also configured to generate a user interface that enables users to access the taxonomy-related content and to navigate between content associated with various concepts of the taxonomy. In certain embodiments, the user interface is in the form of multiple web pages displaying content related to the taxonomy concepts and enabling a user to navigate between the different taxonomy concepts and associated content. In some embodiments, taxonomy automation system 120 may generate a web site comprising web pages for the taxonomy.

In certain embodiments, taxonomy automation system 120 may comprise one or more subsystems such as taxonomy structure generator subsystems 128, SNS interface subsystem 124, and web page generator subsystem 129. Taxonomy automation system 120 and its subsystems may be implemented in software (e.g., using programs, instructions, or code executable by one or more processors), in hardware, or combinations thereof.

As shown in FIG. 1, taxonomy automation system 120 may receive information related to a taxonomy as input in the form of taxonomy specification 110. As indicated above, a taxonomy provides a structure or template for organizing information for a particular domain. A taxonomy for a domain comprises a hierarchical structuring of concepts from generic ones to more specific ones that break down concepts of the given domain. Taxonomy specification 110 may thus comprise information related to a particular domain including a hierarchical structure of the concepts for the domain from generic ones to more specific ones. Additional information may be associated with one or more concepts within a taxonomy. For example, in some examples, taxonomy specification 110 may include information identifying one or more keywords associated with one or more concepts within the taxonomy. A keyword associated with a concept may be representative or descriptive of that concept. Taxonomy specification 110 may be received in various different formats.

Various different mechanisms may be provided by taxonomy automation system 120 that enable a user to provide taxonomy specification 110 to taxonomy automation system 120. In some embodiments, taxonomy automation system 120 may provide an interface through which users may provide taxonomy specification 110. In certain embodiments, taxonomy automation system 120 may also provide a set of taxonomy application program interfaces (APIs) 122 that may be used to provide taxonomy specification 110 to taxonomy automation system 120. A person or application may use these APIs to communicate with taxonomy automation system 120 for providing a taxonomy specification 110 to taxonomy automation system 120. In certain embodiments, taxonomy APIs 122 may define a format for a taxonomy specification to be used for communicating a taxonomy specification to web factory 120. Examples of such formats may include without restriction a comma-delimited document, a space-delimited document, a line-delimited document, or the like.

An example of a format for a taxonomy specification is:
<concept1_info>
<concept2_info>
etc.

In the format, the information for each concept within a taxonomy is provided on a separate line. The format for each<concept_info> may be as follows: id concept_name parent_ids(separated by comma) keywords(separated by comma)

In this format, each category of information for a concept is separated by a tab or space.

Additionally:
"Id" is a unique identifier for a concept; and
"Parent_ids" identifies the unique identifiers for each parent concept of the concept (or child concept).

Typically, apart from the root concept in a taxonomy, each concept has at least one parent. A concept with no parents thus identifies a root concept in the taxonomy. In some cases, a concept may have more than one parent concepts. A parent concept is typically a generalization of the child concept and thus includes the child concept. A child concept is a specialization within the parent concept. For example, for a taxonomy related to recipes, a parent concept may be non-vegetarian recipes and may have a child concept related to chicken recipes.

In response to receiving a taxonomy specification 110 as input, taxonomy automation system 120 is configured to generate a taxonomy structure for implementing the input taxonomy specified by taxonomy specification 110. The taxonomy structure may describe connections between concepts defined in taxonomy specification 110.

One or more data stores 150 accessible by taxonomy automation system 120 may be provided for storing information used or generated by taxonomy automation system 120. One or more of these data stores may be local or remote from taxonomy automation system 120. Data stores 150 may include data structure data store 152 for storing the data structures used for implementing a taxonomy. Data structure data store 152 may further store the one or more keywords as part of the data structures that are used for implementing taxonomies. Since taxonomy automation system 120 is capable of receiving multiple different taxonomies as inputs and implementing the multiple taxonomies, data structure data store 152 may store data structure implementations for multiple taxonomies.

Figure 2:
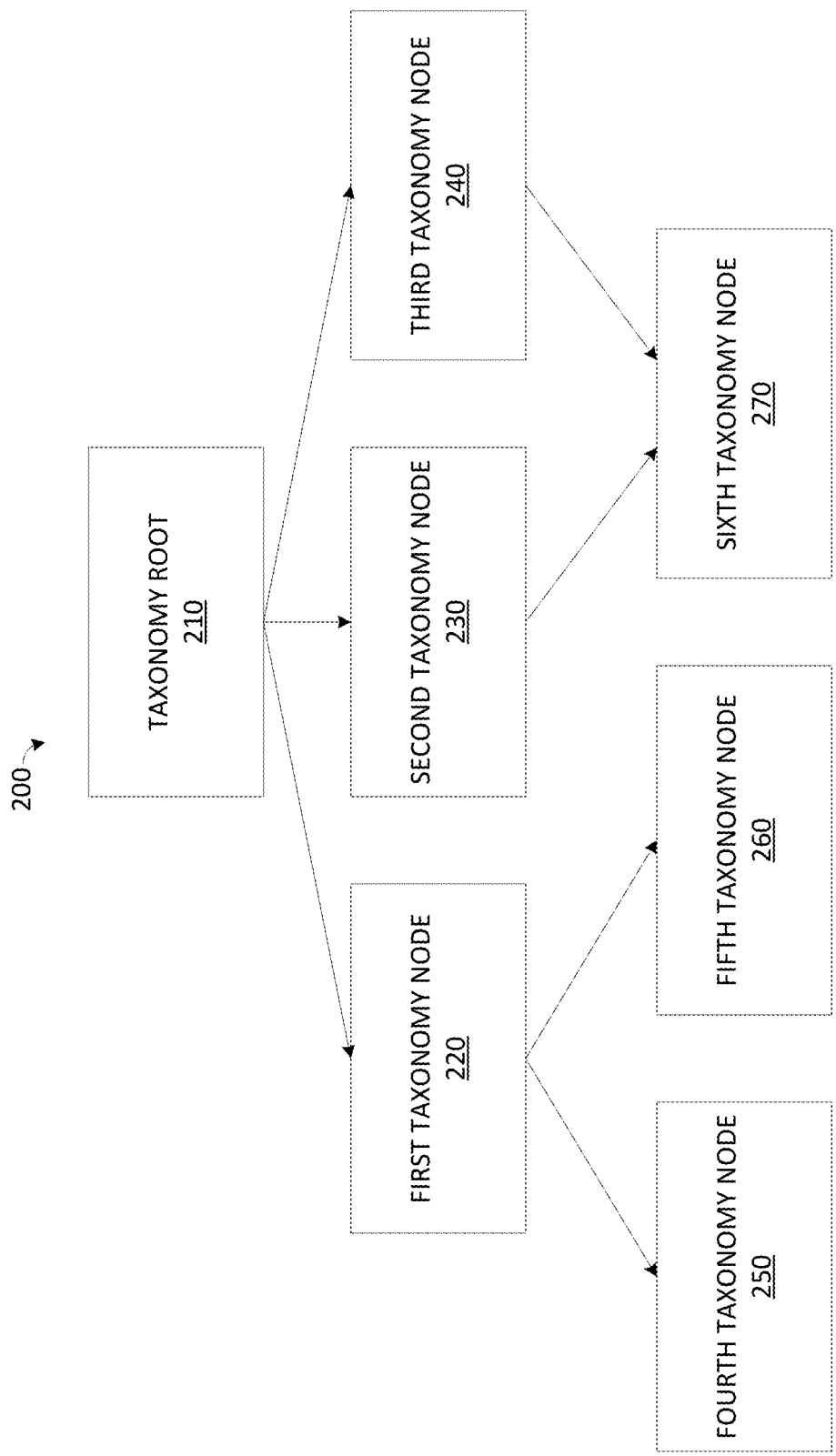
FIG. 2 depicts an example taxonomy structure for implementing a taxonomy that may be generated according to certain embodiments.

FIG. 2 depicts an example taxonomy structure 200 for implementing a taxonomy that may be generated by taxonomy automation system 120 according to certain embodiments. In the example structure 200, each concept identified in a taxonomy specification is represented by a node, referred to as a taxonomy node. Because a taxonomy is associated with a particular domain, taxonomy structure 200 is also associated with the particular domain (sometimes referred to as a specified sphere of knowledge). As depicted in FIG. 2, taxonomy structure 200 includes a taxonomy root node 210, representing the root concept specified in the taxonomy specification. Root node 210 is the topmost node of taxonomy structure 200.

The node connections in structure 200 correspond to the parent-child relationships specified for the concepts in the taxonomy specification. For example, in the embodiment depicted in FIG. 2, the root concept represented by taxonomy root node 210 may have three child concepts, which are represented by taxonomy nodes 220, 230, and 240, that are shown as child nodes of root taxonomy node 210. Root taxonomy node 210 is thus the parent taxonomy node of child taxonomy nodes 220, 230, and 240. The taxonomy specification may specify that a child concept may further have other child concepts, and so on. For example, in FIG. 2, taxonomy nodes 250 and 260 represent concepts that are children of the concept represented by taxonomy node 220. In other words, the concept represented by taxonomy node 220 is a parent concept of the concepts represented by taxonomy nodes 250 and 260. Likewise, the concept represented by taxonomy node 270 is a child of both the concept represented by taxonomy node 230 and the concept represented by taxonomy node 240. In other words, the concepts represented by taxonomy nodes 230 and 240 are parent concepts of the child concept represented by taxonomy node 270. In this manner, a structure 200 is generated by taxonomy automation system 120 to represent the various concepts and their hierarchical relationships specified in the taxonomy specification for a taxonomy.

As described above, a parent concept is typically a generalization of the child concept and thus includes the child concept. A child concept is a specialization within the parent concept. Accordingly, within structure 200, moving from a parent node to a child node represents navigating from a generic concept to a more specific concept that is included in the generic concept. Moving from a child node to a parent node represents navigating from a specific concept to a more generic concept that includes the specific concept.

In taxonomy structure 200, taxonomy nodes that have the same parent taxonomy node are considered sibling taxonomy nodes. For example, in the example in FIG. 2, taxonomy nodes 220, 230, and 240 are sibling taxonomy nodes. Likewise, taxonomy nodes 250 and 260 are sibling taxonomy nodes. Moving between sibling taxonomy nodes represents navigating between related concepts.

Various different data structures may be used to generate taxonomy structure 200. For example, in certain embodiments, various types of trees or graphs may be used to implement structure 200. In one illustrative example, a directed acyclic graph is used.

FIG. 3A depicts an example of taxonomy node 300 according to certain embodiments. Taxonomy node 300 may represent taxonomy nodes in a taxonomy structure such as taxonomy structure 200. Taxonomy node 300 may be associated with a concept defined in a taxonomy specification. Taxonomy node 300 depicted in FIG. 3A is merely an example and is not intended to unduly limit the scope of inventive embodiments recited in the claims. One of ordinary skill in the art would recognize many possible variations, alternatives, and modifications. For example, in some implementations, taxonomy node 300 may have more or fewer fields than those shown in FIG. 3A, or may combine two or more fields.

In the example depicted in FIG. 3A, taxonomy node 300 includes identification information 310, one or more keywords 320, and content 330. Identification information 310 may include a name and/or a unique identifier identifying the concept represented by the taxonomy node. For example, if the taxonomy specification has a unique identifier for a concept, that identification information 310 may store that unique identifier. In some embodiments, taxonomy automation system 120 may assign a unique identifier to a concept when taxonomy structure 200 is being built and may store information related to that unique identifier as identification information 310.

Keywords 320 may store information identifying one or more keywords associated with the concept represented by the taxonomy node. These keywords may include one or more keywords, if any, specified in the taxonomy specification for the concept represented by the taxonomy node. Keywords field 320 may also store information about one or more keywords determined by taxonomy automation system 120 for the concept. Further details related to how taxonomy automation system 120 determines keywords for a concept are described below.

In certain embodiments, keywords 320 are used by taxonomy automation system 120 to search for and identify content that is relevant to the concept represented by the taxonomy node. For example, as explained below in further detail, taxonomy automation system 120 may use keywords 320 to search SNS 130 to identify content from SNS 130 that is relevant to the concept represented by the taxonomy node. The content that is identified to be relevant to a concept may be stored as content 330 in a taxonomy node representing the concept. Accordingly, content 330 may store a result of searching SNS 130 using one or more keyword 320.

While it is shown that each of identification information 310, keywords 320, and content 330 are included in taxonomy node 300, it should be recognized that taxonomy node 300 may include references to one or more of them. For example, taxonomy node 300 may include a pointer to content 330, which may be stored in a content data store such as content data store 156 in FIG. 1.

Figure 3B:
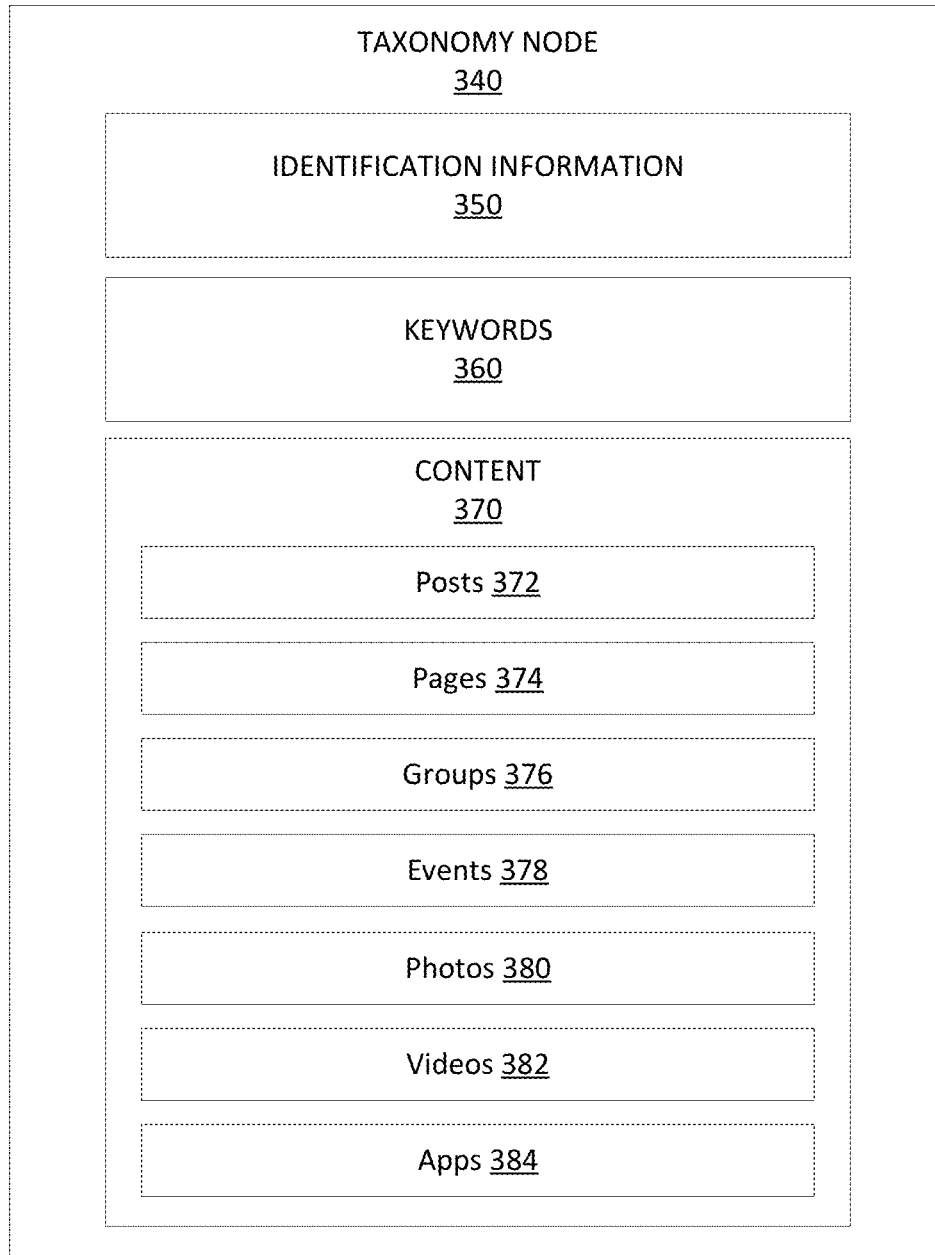
FIG. 3B depicts another example of a taxonomy node according to certain embodiments.

FIG. 3B depicts an example of taxonomy node 340 according to certain embodiments. Taxonomy node 340 may be substantially similar to taxonomy node 300. In particular, identification information 350 may be similar to as described above for identification information 310, and keywords 360 may be similar to as described above for keywords 320.

One difference between taxonomy node 340 and taxonomy node 300 may be a format of content 370. For example, content 370 (similar to content 330 from FIG. 3A) may be separated into multiple types of content. By separating into multiple types of content, web pages may be easily generated for particular types of content.

Examples of types of content include, but are not limited to: posts 372, pages 374, groups 376, events 378, photos 380, videos 382, and apps 384. For illustration: posts 372 may be textual messages sent from a user of a social networking system (SNS) to one or more other users of the SNS; pages 374 may be web pages (or similar graphical user interfaces) that are provided by the SNS for sharing information regarding a subject; groups 376 may be one or more users and/or entities of the SNS that are related to each other; events 378 may be information associated with a location and/or time; photos 380 may be images that were posted by a user of the SNS; videos 382 may be a sequence of images that were posted by a user of the SNS; and apps 384 may be an application that is executable by a device of a user.

Various different data structures may be used for a taxonomy node. For example, in certain embodiments, various types of objects may be used to implement a taxonomy node. Other data structures may be used in other embodiments.

As described above, in response to receiving taxonomy specification 110 as input, taxonomy automation system 120 is configured to generate and populate data structures for implementing the specified taxonomy. In certain embodiments, taxonomy structure generator subsystem 128 may be configured to generate and populate the appropriate data structures for implementing the specified taxonomy. As part of populating the taxonomy structure (e.g., the taxonomy structure depicted in FIG. 2 with taxonomy nodes depicted in FIG. 3), for each concept identified in a taxonomy, a search is performed using a set of keywords specified for that concept to identify content that is relevant to that concept. In some examples, these keywords may be specified in taxonomy specification 110. However, in certain instances, the taxonomy specification may not specify any keywords or may not specify keywords for all of the concepts. Further, the keywords specified in taxonomy specification 110 may not be sufficient to perform a proper search for the taxonomy concepts.

In order to overcome such keyword-related deficiencies of taxonomy specification 110, taxonomy automation system 120 includes a keyword expansion subsystem 126 that is configured to expand the set of keywords associated with each concept of a taxonomy. While keyword expansion subsystem 126 is shown as part of taxonomy automation system 120 in the example depicted in FIG. 1, in certain embodiments, keyword expansion subsystem 126 may be part of a system separate from taxonomy automation system 120. For example, keyword expansion subsystem 126 may be part of systems providing tools and services 140.

Figure 6:
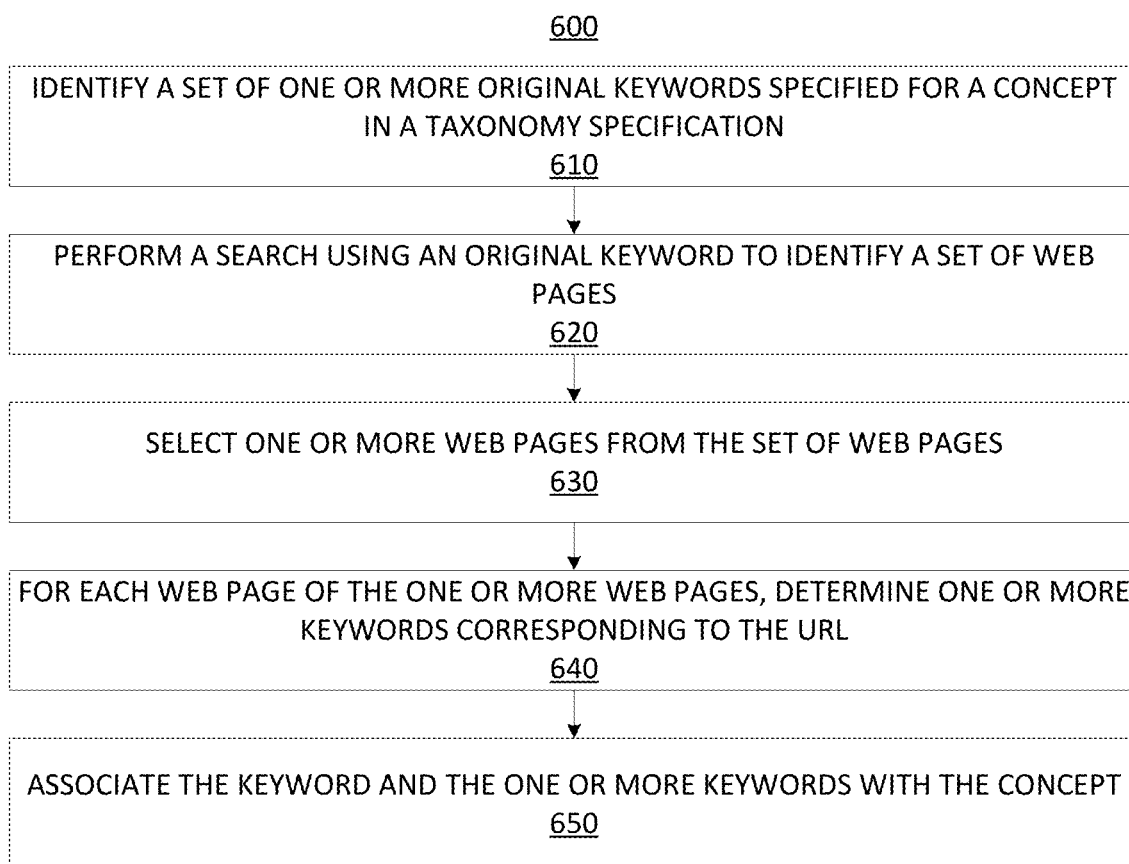
FIG. 6 is a simplified flowchart depicting processing performed for expanding keywords associated with a taxonomy concept according to certain embodiments.

In certain embodiments, keyword expansion subsystem 126 uses tools and services 140 (provided by systems external to taxonomy automation system 120) to expand keywords associated with a concept of a taxonomy. In some instances, keyword expansion is done using services provided by a keyword-to-uniform resource locator (URL) subsystem 142 and a URL-to-keyword subsystem 144. Details related to the services used for keyword expansion for a concept is depicted in FIG. 6 and described below. While keyword-to-URL subsystem 142 and URL-to-keyword subsystem 144 are shown as two separate subsystems in FIG. 1, it should be recognized that in some other embodiments a single system for providing the functions performed by subsystems 142 and 144, or the functions may be provided by more than just two subsystems. Further, it should also be recognized that various other methods may be used for expanding the keywords associated with concepts.

For each concept, a set of keywords associated with that concept may be stored in a taxonomy node representing that concept in the taxonomy structure. For example, the set of keywords may be stored in keywords 320 of the taxonomy node corresponding to that concept. These keywords may include zero or more keywords specified for the concept in taxonomy specification 110 and additionally one or more keywords determined by taxonomy automation system 120 from performing keywords expansion processing.

In certain embodiments, for each concept in the taxonomy, the one or more keywords associated with the concept are used to search for and determine content that is relevant to that concept. In certain embodiments, the relevant content is determined from content stored by a SNS such as SNS 130 depicted in FIG. 1. For example, in the example depicted in FIG. 1, content stored by SNS content data store 134 of SNS 130 may be searched to identify content that is relevant to the concepts of the taxonomy. In certain embodiments, a search engine 132 of SNS 130 may be used for searching the content stored in data store 134 to order content relevant to the concepts of the taxonomy.

In the example depicted in FIG. 1, taxonomy automation system 120 includes SNS interface subsystem 124 for communicating and interacting with SNS 130. Taxonomy structure generator subsystem 128 may use the services of SNS interface subsystem 124 to search content stored by SNS 130 to identify content relevant to concepts of a taxonomy being processed by taxonomy automation system 120.

In certain embodiments, SNS interface subsystem 124 interacts with SNS 130 using a set of APIs provided and published by SNS 130. For example, SNS interface subsystem 124 may communicate a search request for a keyword to SNS 130 using one or more APIs provided by SNS 130. In a similar manner, SNS interface subsystem 124 may receive the search results from SNS 130 using one or more APIs provided by SNS 130.

In certain embodiments, a search request prepared by SNS interface subsystem 124 for a taxonomy concept may include information identifying the concept (e.g., a concept identifier) and a set of one or more keywords associated with that concept. The set of keywords for a concept may include zero or more keywords specified for the concept in taxonomy specification 110 and zero or more keywords determined for the concept from performing keywords expansion processing.

In certain embodiments, upon receiving a search request from taxonomy automation system 120, SNS search engine 132 of SNS 130 is configured to search content stored by SNS 130 using the set of keywords identified in the search request. For example, SNS search engine 132 may search content stored in SNS content data store 134 using the set of keywords. The result of the search may represent content that is deemed relevant to a concept corresponding to the set of keywords.

Results obtained by SNS search engine 132 from performing searches for a concept may be returned back to SNS interface subsystem 124 of taxonomy automation system 120. These results represent content that is deemed relevant to the concept for which the search was performed using one or more keywords associated with the concept. SNS interface subsystem 124 may then forward the search results to taxonomy structure generator subsystem 128, which may then store the results in a taxonomy node for the concept. In certain embodiments, the results may be stored in content field 330 in the taxonomy node for the concept as part of taxonomy structure data stored in data store 152. In some embodiments, the relevant content identified for a concept may be stored in content data store 154 and a pointer or reference in content field 330 for the concept may point to the relevant content data in data store 154.

In the manner described above, taxonomy automation system 120 is configured to cause a search to be performed and relevant content to be identified for each concept in the taxonomy. The relevant content is then associated with the taxonomy node representing the concept. In this manner, relevant content is identified for the multiple concepts specified in the taxonomy.

In some embodiments, searches for relevant content may be performed on a periodic basis such that relevant content associated with a concept is kept up to date with changing content in SNS 130. For example, after either a period of time, the search process described above may be repeated such that new content on SNS 130 is captured for a concept.

While only one SNS 130 is shown in FIG. 1, this is not intended to be limiting. Taxonomy automation system 120 may interface with multiple SNSs and search the contents of the multiple SNSs to identify content that is relevant to concepts of a taxonomy being implemented by taxonomy automation system 120. In this manner, content from multiple SNSs may be used to find content that is relevant to a concept of a taxonomy being implemented by taxonomy automation system 120.

In certain embodiments, taxonomy automation system 120 is configured to generate an interface that enables users to access content related to the taxonomy. The interface may allow users to access content relevant to specific concepts of the taxonomy. Additionally, the interface generated by taxonomy automation system 120 may enable users to navigate between the different taxonomy concepts and their associated relevant data. For example, the interface may enable users to, for a particular taxonomy concept, access the relevant content for that concept. The interface thus enables linking from the taxonomy to content relevant to the taxonomy, and from the content to the relevant taxonomy concepts.

In certain embodiments, the interface generated by taxonomy automation system 120 is in the form of web pages. In particular, one or more webpages may be generated for a taxonomy. The web pages may display content relevant to specific concepts of the taxonomy. The web pages may also enable a user to navigate between the different concepts of the taxonomy and to access related relevant content. In the embodiment depicted in FIG. 1, taxonomy automation system 120 includes a web page generator subsystem 129 that is configured to generate a set of web pages for a taxonomy based upon the taxonomy structure generated by taxonomy automation system 120 for the taxonomy.

As indicated above, one or more web pages (e.g., web pages 160) may be generated for a taxonomy. In certain embodiments, a web page may be generated for each taxonomy node of the taxonomy structure for the taxonomy. For example, for the taxonomy structure depicted in FIG. 2, a first web 162 may be generated for taxonomy node 220, a second web page 164 may be generated for taxonomy node 230, and so on. A web page generated for a taxonomy node may include and display content (or a portion thereof) that is identified as relevant to the concept corresponding to the taxonomy node. For example, web page 162 generated for taxonomy node 220 may include and output content (or a portion thereof) that is identified as being relevant to the concept corresponding to taxonomy node 220. In certain embodiments, the content output on a web page for a concept may be organized on the web page based upon the type of content such as posts, pages, groups, events, photos, videos, applications, or other content types.

In certain embodiments, in addition to relevant content, a web page generated for a taxonomy concept also provides links that enable a consumer of the web page to navigate between the different concepts of the taxonomy and their relevant content. For example, a web page generated for a particular concept may include links to access web pages generated for parent concepts, child concepts, or sibling concepts of the particular concept.

In an embodiment where the taxonomy structure for a taxonomy comprises one taxonomy node for each concept in the taxonomy, and where a web page is generated for each taxonomy node or concept, the number of web pages generated is equal to the number of taxonomy concepts or the number of taxonomy nodes in the taxonomy structure. This is however not intended to be limiting. In some other embodiments, the number of web pages generated for a taxonomy may be more than the total number of taxonomy nodes or concepts in the taxonomy. For example, in one such embodiment, multiple web pages may be generated for a taxonomy node and its corresponding taxonomy concept. In such an example, different web pages may be generated for different types of content. In yet other embodiments, the number of web pages generated for a taxonomy may be less than the total number of taxonomy nodes or concepts in the taxonomy. For example, in one such embodiment, a web page need not be generated for each taxonomy node or taxonomy concept. For another example, multiple taxonomy nodes and/or taxonomy concepts may be combined in a single web page.

Figure 4:
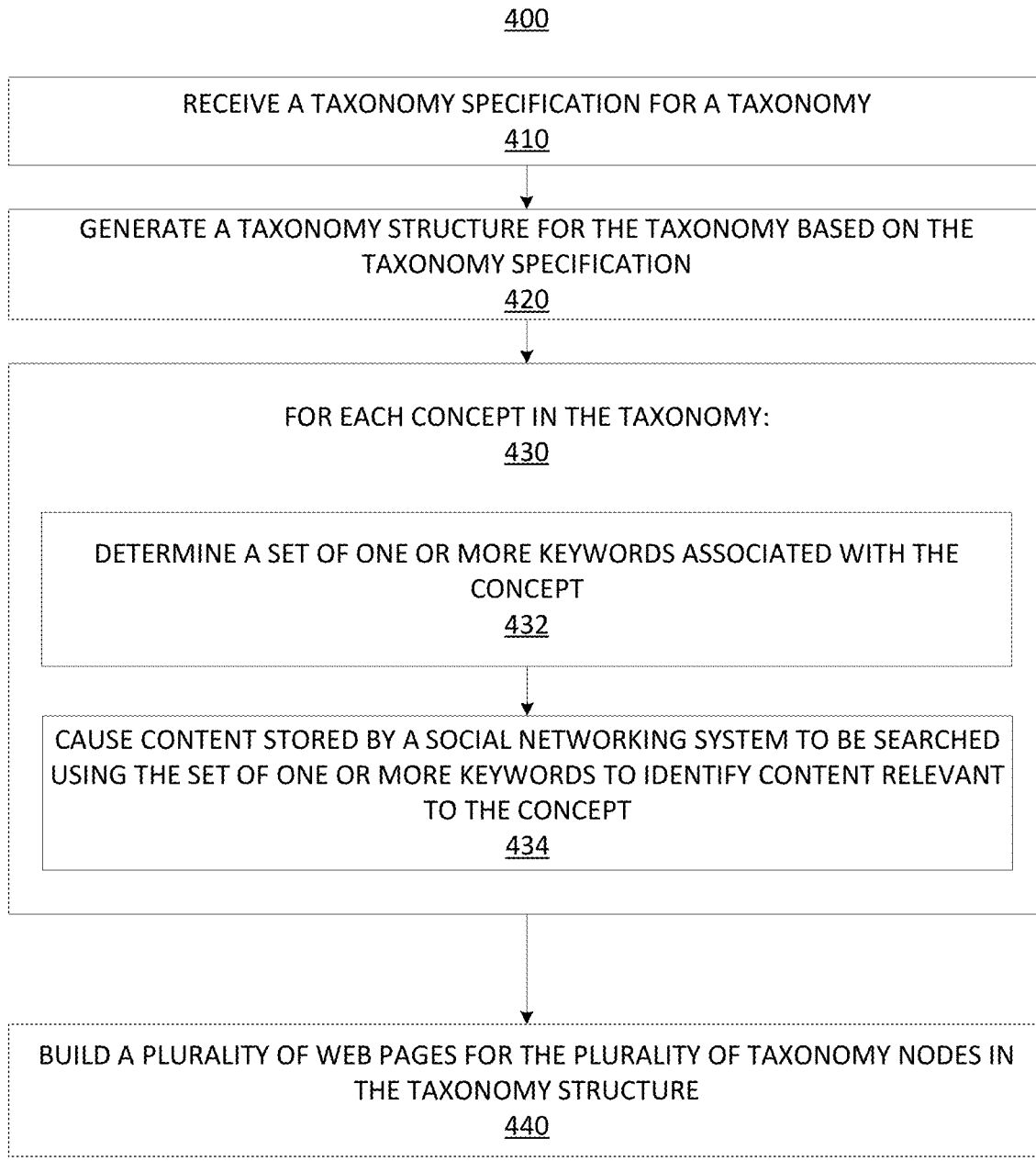
FIG. 4 is a simplified flowchart depicting a method for implementing a taxonomy upon receiving a taxonomy specification for the taxonomy according to certain embodiments.

FIG. 4 is a simplified flowchart 400 depicting a method for implementing a taxonomy upon receiving a taxonomy specification for the taxonomy according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain embodiments, the steps may be performed in some different order or some steps may also be performed in parallel. In the embodiment depicted in FIG. 1, the processing depicted in FIG. 4 may be performed by taxonomy automation system 120, however, this is not intended to be limiting.

In the embodiment depicted in FIG. 4, the processing may be triggered at 410, when a taxonomy specification for a taxonomy to be implemented is received as input. The taxonomy specification may identify multiple concepts included in the taxonomy, hierarchical relationships between the concepts, and possible keywords associated with the concepts. The taxonomy specification may define a taxonomy for a particular domain (or vertical).

The taxonomy specification may be received from one or many possible sources. For example, a user may provide the taxonomy specification. In some embodiments, the user may be a member of a social networking system (SNS). As another example, the taxonomy specification may be provided to the taxonomy automation system by a SNS. As yet another example, the taxonomy specification may be received by taxonomy automation system 120 from one or more applications or systems.

In some embodiments, the taxonomy specification may be generated manually by a person. In other embodiments, the taxonomy specification may be generated automatically (or semi-automatically) by natural language processing-based techniques, machine learning-based techniques, or the like. For example, a system may crawl a network (such as the Internet) to identify concepts for a particular domain and then generate a taxonomy specification based on the concepts identified for the particular domain.

At 420, a taxonomy structure may be generated for the taxonomy based on the taxonomy specification. The taxonomy structure may include multiple taxonomy nodes corresponding to the concepts specified in the taxonomy specification for the taxonomy. An example of taxonomy structure is depicted in FIG. 2 and described above. In certain embodiments, a taxonomy node (also referred to as "taxon") may be created for each concept in the taxonomy. An example of taxonomy node is depicted in FIGS. 3A-3B and described above. This however is not intended to be limiting. The structure of a taxonomy node may be different in other embodiments.

As part of 420, hierarchical relationships (e.g., parent-child relationships) are established between the taxonomy nodes based upon the information in the taxonomy specification. The one-to-one mapping between concepts and taxonomy nodes is not intended to be limiting. In some embodiments, a different mapping (e.g., a single taxonomy node for multiple concepts) may be used.

Once the taxonomy structure is created, processing depicted in 430 is used to populate the taxonomy structure. In certain embodiments, the processing in 430 is performed for each taxonomy concept in the taxonomy. In an embodiment where the taxonomy structure includes a taxonomy node for each taxonomy concept, the processing in 430 is performed for each taxonomy node in the taxonomy structure.

At 432, a set of one or more keywords associated with a concept (or for a taxonomy node where there is a one-to-one mapping between concepts and taxonomy nodes) is determined. The keywords may include zero or more keywords specified for the concept in the taxonomy specification received in 410 and additionally one or more keywords determined by performing keywords expansion processing, which is performed as part of 432. The determined keywords are then associated with the taxonomy node corresponding to the concept being processed.

At 434, the set of keywords determined for a concept in 432 is used to search and identify content that is relevant to the concept. In certain embodiments, as part of 434, content stored by a SNS is searched using the set of keywords determined in 432 to identify content that is relevant to the concept. This relevant content is then associated with the taxonomy node corresponding to the concept.

At 440, multiple web pages may be generated for the taxonomy concepts (e.g., taxonomy nodes in the taxonomy structure). In some embodiments, a different web page may be built for each taxonomy node. However, it should be recognized that a single web page may be built for multiple taxonomy nodes and/or multiple web pages can be built for a single taxonomy node. For a concept or taxonomy node, the web page generated for the concept may include content (or a portion thereof) identified as relevant for the concept in 434). The web page generated for a taxonomy concept may also include one or more links to different concepts of the taxonomy and their relevant content. For example, a web page generated for a particular concept may include links to access web pages generated for parent concepts, child concepts, or sibling concepts of the particular concept.

Figure 5:
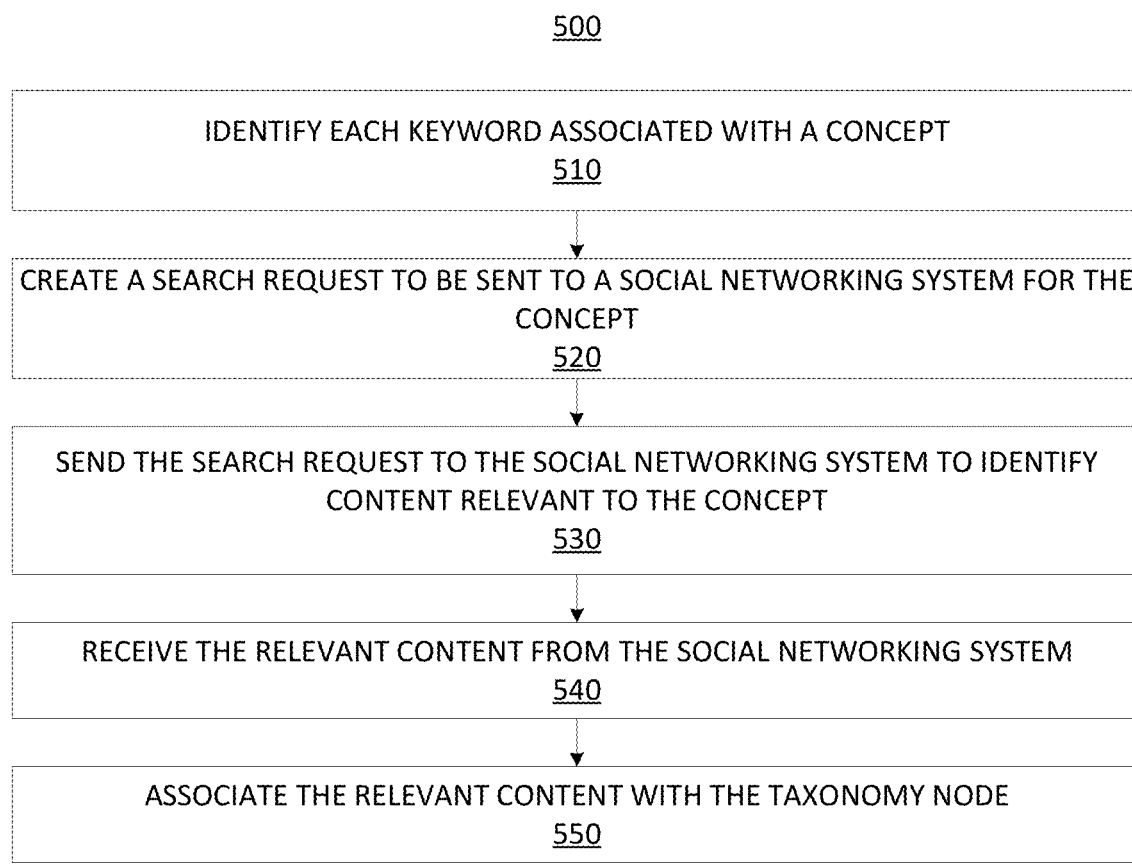
FIG. 5 is a simplified flowchart depicting processing performed by a system for searching social networking system content to identify relevant content for a taxonomy concept according to certain embodiments.

FIG. 5 is a simplified flowchart 500 depicting processing performed by a system, such as a taxonomy automation system (e.g., taxonomy automation system 120), for searching social networking system (SNS) content to identify relevant content for a taxonomy concept according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain embodiments, the steps may be performed in some different order or some steps may also be performed in parallel. In the embodiment depicted in FIG. 1, the processing depicted in FIG. 5 may be performed by taxonomy automation system 120 in cooperation with a SNS, however, this is not intended to be limiting. In one embodiment, the processing in FIG. 5 may be performed as part of 434 in FIG. 4.

In the embodiment depicted in FIG. 5, the processing may be performed for each concept (or for each taxonomy node where there is a one-to-one mapping between taxonomy concepts and taxonomy nodes). At 510, for a concept, the set of one or more keywords associated with the concept (or associated with the taxonomy node corresponding to the concept) are identified. The keywords may include zero or more keywords specified for the concept in the taxonomy specification and additionally one or more keywords determined by performing keywords expansion processing.

At 520, a search request to be sent to a SNS may be created for the concept. In certain embodiments, the search request may include information identifying the concept (e.g., a concept identifier) and the set of one or more keywords associated with that concept.

At 530, the search request created in 512 is communicated to a SNS to identify content relevant to the concept. In certain embodiments, the SNS may be searched using a search engine provided by the SNS.

At 542, the search results are communicated from the SNS to the taxonomy automation system 120. At 550, the search results received in 522 are associated with the taxonomy node corresponding to the concept. These search results represent content that is relevant for that concept.

FIG. 6 is a simplified flowchart 600 depicting processing performed by a system, such as a taxonomy automation system (e.g., taxonomy automation system 120), for expanding keywords associated with a taxonomy concept according to certain embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain embodiments, the steps may be performed in some different order or some steps may also be performed in parallel. In the embodiment depicted in FIG. 1, the processing depicted in FIG. 6 may be performed by taxonomy automation system 120 in cooperation with keyword-to-URL subsystem 142 and URL-to-keyword subsystem 144, however, this is not intended to be limiting.

For purposes of simplifying the description of FIG. 6, the set of keywords specified for a taxonomy concept in the taxonomy specification are referred to as the "original set of keywords". Per the processing depicted in FIG. 6 and the accompanying description, these original set of keywords are then used to identify additional one or more keywords for the taxonomy concept, thereby expanding the overall set of keywords associated with the taxonomy concept.

In the embodiment depicted in FIG. 6, at 610, a set of one or more original keywords specified for the concept in the taxonomy specification is identified. For purposes of simplicity, it is assumed that the set identified in 610 includes a single original keyword. In the situation where the set identified in 610 includes multiple original keywords, the processing in 620, 630, and 640 may be repeated for each of the original keywords.

At 620, a search is performed using the original keyword identified in 610 to identify a set of one or more web pages (or URLs in general) that are returned from the search. In certain embodiments, the original keyword is provided as input to a search engine (e.g., Yahoo search, Google search, or the like). In some embodiments, taxonomy automation system 120 may utilize a tool and/or service for performing the search. For example, the services of a keyword-to-URL subsystem 142 may be used to perform the search using the original keyword to identify URLs related to the original keyword. The set of web pages returned by the search may be ranked based on relevance of content of documents corresponding to the web pages to the original keyword. At 630, one or more web pages may be selected from the set of web pages based on relevance to the original keyword.

At 640, for each web page selected in 630, the content of the document corresponding to the web page may be processed to identify one or more words that are to be designated as additional keywords to be associated with the concepts. In some embodiments, taxonomy automation system 120 may utilize a tool and/or service for determining one or more keywords associated with a URL (such as URL-to-keyword subsystem 144 depicted in FIG. 1). While 620, 630, and 640 are illustrated as separate steps, it should be recognized that a single utility may perform the steps. For example, a single utility can output additional keywords after receiving a keyword as input.

At 650, in addition to the original set of keywords, the additional one or more keywords determined above may be associated with the concept. In certain embodiments, the original keywords and the additional keywords may be associated as keywords 320 with a taxonomy node corresponding to the taxonomy concept. In some embodiments, associating the keywords with a taxonomy node may include inserting the keywords into the taxonomy node. In other embodiments, associating the keywords with a taxonomy node may include inserting pointers to the keywords in the taxonomy node, where the keywords themselves are stored in a keyword data store (e.g., keyword data store 154 in FIG. 1).

As described above, tools and services 140 such as keyword-to-URL subsystem 142 may be used for keywords expansion. In certain embodiments, the search engine used by keyword-to-URL subsystem 142 is a different search engine from SNS search engine 132. By using a different search engine, keyword-to-URL subsystem 142 may locate URLs that would not be identified by SNS search engine 132.

As further described above, the process of expanding keywords associated with a taxonomy concept may also use the services of URL-to-keyword subsystem 144. In some embodiments, a URL (or web page) may be input to URL-to-keyword subsystem 144 and one or more keywords may be output, which are then associated with a taxonomy node corresponding to a taxonomy concept. By using keyword-to-URL 142 in combination with URL-to-keyword subsystem 144, taxonomy automation system 120 may expand a single original keyword associated with a taxonomy concept into multiple keywords. Both the single original keyword and the one or more additional keywords determined from performing keyword expansion processing may be associated with a taxonomy node corresponding to the taxonomy concept.

Figure 7:
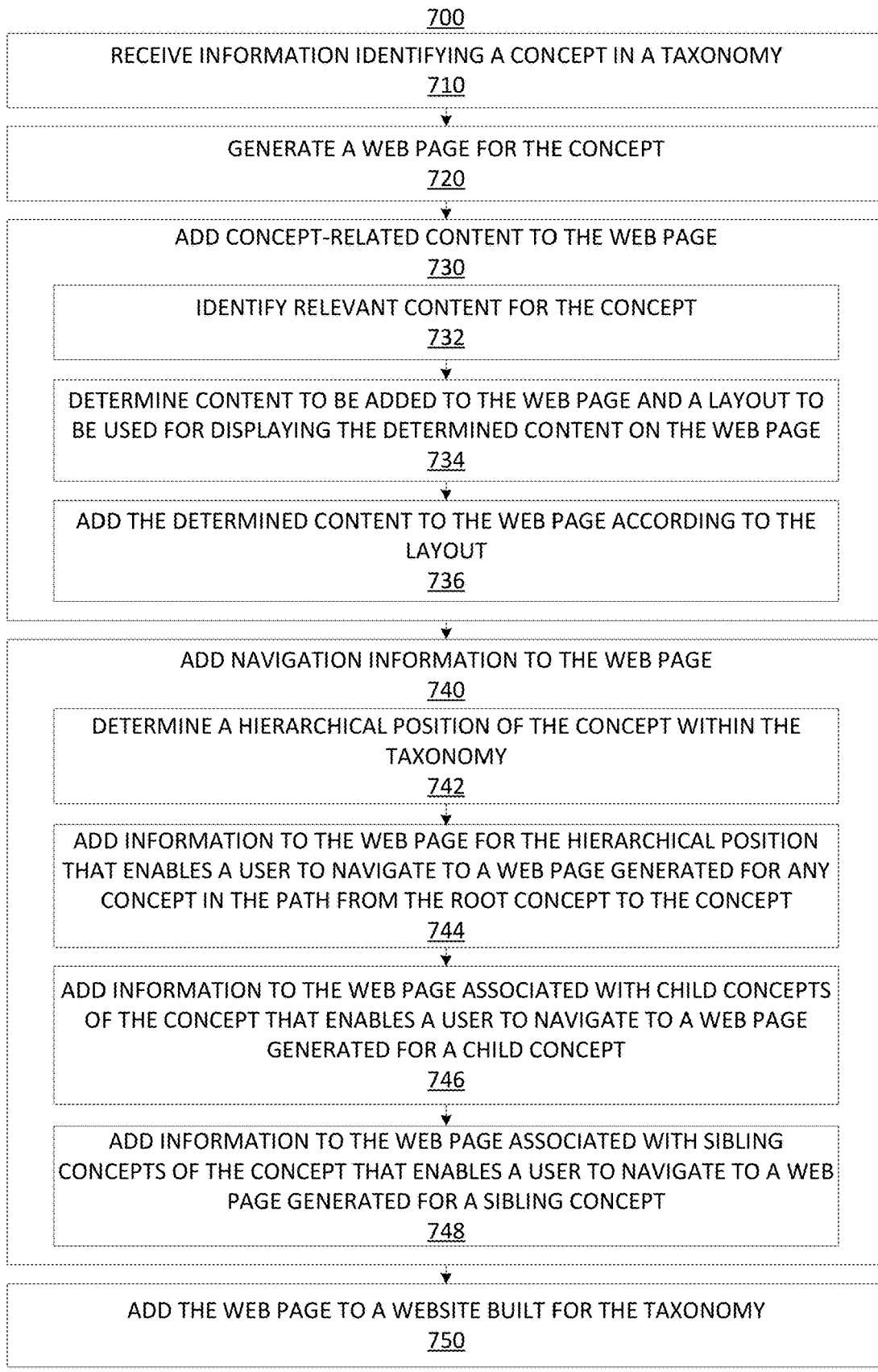
FIG. 7 is a simplified flowchart depicting processing performed for expanding keywords associated with a taxonomy concept according to certain embodiments.

FIG. 7 is a simplified flowchart 700 depicting processing performed by a system, such as a taxonomy automation system (e.g., taxonomy automation system 120), for building a web page for a concept corresponding to a taxonomy node according to certain embodiments. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 7 and described below is intended to be illustrative and non-limiting. Although FIG. 7 depicts the various processing steps occurring in a particular sequence or order, this is not intended to be limiting. In certain embodiments, the steps may be performed in some different order or some steps may also be performed in parallel. In the embodiment depicted in FIG. 1, the processing depicted in FIG. 6 may be performed by taxonomy automation system 120, however this is not intended to be limiting.

In the embodiment depicted in FIG. 7, the processing may be triggered at 710, when information is received identifying a concept from among multiple concepts in a taxonomy for which one or more web pages are to be generated. For purposes of the embodiment depicted in FIG. 7, it is assumed that a single web page is generated for the concept. However, this is not intended to be limiting. In other examples, multiple web pages may be generated for a concept (e.g., for different types of content associated with the concept). Further, it is assumed for the flowchart depicted in FIG. 7 and the accompanying description that the taxonomy structure generated for the taxonomy comprises a taxonomy node corresponding to the concept. The taxonomy node may include or point to information identifying the concept, one or more keywords associated with the concept, content that has been identified as being relevant to the concept, and other information.

At 720, a web page is generated for the concept. At 730, concept-related content is added to the web page. By adding the concept-related content, the web page may be a visual representation of different types of content included in a social networking system (SNS) for the concept. For example, a first portion of the web page may be associated with a first type of content and a second portion of the web page may be associated with a second type of content. In other embodiments, the web page may be a visual representation of a single type of content included in the SNS.

Adding the concept-related content may include, at 732, identifying relevant content for the concept. In certain embodiments, as part of 732, a taxonomy node corresponding to the concept is identified and used to identify content that is relevant to the concept. Examples of the content that is relevant to a concept may include posts, pages, groups, events, photos, videos, apps, and the like from the SNS, and other content.

At 734, content to be added to the web page is determined. The content to be added to the web page may be all of the content determined in 732 or a portion thereof. In some embodiments, the content to be added to the web page may be based on any method known in the art. For example, content with more views may be prioritized over content with fewer views. In certain embodiments, the content placed in the web page may be from one or more users of the SNS. For example, some content may have been posted to the SNS by a first user while other content may have been posted to the SNS by a second user. A layout to be used for displaying the determined content on the web page is also determined. Then, at 736, the determined content is added to the web page according to the layout.

At 740, navigation information is added to the web page. Adding the navigation information may include, at 742, determining a hierarchical position of the concept within the taxonomy. Determining the hierarchical position may include determining a path from a root node to a taxonomy node associated with the concept. At 744, information is added to the web page for the hierarchical position that enables a user to navigate to a web page generated for any concept in the path from the root concept to the concept (e.g., parent concepts). The information may include a link (e.g., a URL). At 746, information (e.g., a link) is added to the web page associated with child concepts of the concept that enables a user to navigate to a web page generated for a child concept. At 748, information (e.g., a link) is added to the web page associated with sibling concepts of the concept that enables a user to navigate to a web page generated for a sibling concept.

At 750, the web page is added to a website built for the taxonomy. The processing depicted in FIG. 7 and described above may be repeated for each of the concepts of a taxonomy to build the website for the taxonomy. A user may then access these web pages via the website. In some embodiments, these web pages may be made accessible via the SNS or some other server/system.

Figure 8:
FIG. 8 depicts an example of a web page generated for a concept according to certain embodiments.

FIG. 8 depicts an example web page 800 generated for a concept (e.g., pie recipes) according to certain embodiments. The concept may be associated with a taxonomy node in a taxonomy structure. For example, web page 800 may be generated based on the taxonomy node. Web page 800 includes concept identifier 810, which may identify the concept.

Web page 800 further includes path 820, which indicates a path from a root concept to the concept. Each portion of the path may be a link to a web page associated with a concept corresponding to the portion. In FIG. 8, the path includes "Recipes," "Dessert Recipes," "Pie Recipes," and "Posts." Accordingly, recipes would be the root concept, indicating that "recipes" is the domain of the taxonomy associated used for generating web page 800. Path 820 also indicates that "dessert recipes" is a child of the root concept and that "pie recipes" is a child of "dessert recipes." In some embodiments, path 820 may stop at the concept (e.g., pie recipes). However, in other embodiments, path 820 may include a type of content that is associated with the concept. For example, FIG. 8 illustrates web page 800 is associated with a type of content: "posts." In some embodiments, path 820 may indicate a path from a root node of a taxonomy structure to the taxonomy node, or to a particular type of content from the taxonomy node (as illustrated in FIG. 8).

Web page 800 further includes children links 830 (sometimes referred to as filters). Children links 830 may be navigation information that enables a user to navigate to a web page generated for children of the concept that is associated with web page 800. By selecting a link in children links 830, a web page may be provided corresponding to the concept associated with the link. For example, "Fruit Pie Recipes" may be a child of "Pie Recipes" (e.g., a fruit pie is a type of pie). By selecting "Fruit Pie Recipes," a link may be activated causing a web page associated with "Fruit Pie Recipes" to be presented.

Web page 800 further includes sibling links 840 (sometimes referred to as related concepts). Sibling links 840 may be navigation information that enables a user to navigate to a web page generated for siblings of the concept that is associated with web page 800. By selecting a link in sibling links 840, a web page may be provided corresponding to the concept associated with the link. For example, "Cookie Recipes" may be a sibling of "Pie Recipes" (e.g., cookies are a type of dessert similar to pies). By selecting "Cookie Recipes," a link may be activated causing a web page associated with "Cookie Recipes" to be presented.

Web page 800 further includes alternative path 850 (sometimes referred to as a reverse index). Alternative path 850 may be navigation information that enables a user to navigate to a web page generated for parent nodes of the concept associated with web page 800 that are included in a different path than path 820. For example, multiple leading paths may be retrieved, each leading path indicating a different path from a taxonomy root to a taxonomy node in a vertical (i.e., a taxonomy node may have multiple parents). By selecting a link in alternative path 840, a web page may be provided corresponding to the concept associated with the link. For example, "Specialty Desserts" may be a parent of "Pie Recipes" (e.g., pie recipes are a type of specialty dessert). By selecting "Specialty Desserts," a link may be activated causing a web page associated with "Specialty Desserts" to be presented.

In some embodiments, alternative path 850 may be navigation information that enables a user to navigate to a web page generated for a node of a concept from a different taxonomy specification than used to generate web page 800. For example, the different taxonomy specification may include a concept that overlaps with a concept used to generate web page 800. In such an example, alternative path 850 may provide links to parent nodes of the concept from the different taxonomy specification. In one illustrative example, "kale" may be in both a vertical for health foods and vegetarian foods. Accordingly, path 820 may correspond to the health foods vertical and alternative path 850 may correspond to the vegetarian foods vertical.

Web page 800 further includes content 860, which may be relevant to the concept associated with web page 800. The content 860 may be included with a taxonomy node associated with the concept. In certain embodiments, content 860 may be a subset of content included with the taxonomy node. For example, the taxonomy node may include ten posts and content 860 may include two of the ten posts. The particular content 860 inserted into web page 800 may be based on a ranking system for content that is included with the taxonomy node. For example, high ranked content may be used in web page 800. However, it should be recognized that other ways to determine which content to inset may be used, such as selecting content to achieve variety in content.

In some embodiments, content 860 may be associated with one or more types of content. For example, content 860 is associated with "posts." While only one type of content is illustrated in FIG. 8, it should be recognized that more types of content may be included in content 860.

Web page 800 further includes content based on content type 870. Content based on content type 870 may include one or more areas, each area associated with a different type of content. In each area, content may be included that is of a particular type. For example, content based on content type 870 includes a "photos" area, a "videos" area, a suggested pages area, and a suggested groups area. In each area, top content of the particular type of content may be included. The top content may be identified based on any method for ranking content. Web page 800 may further include other content, such as advertisements or the like.

Figure 9:
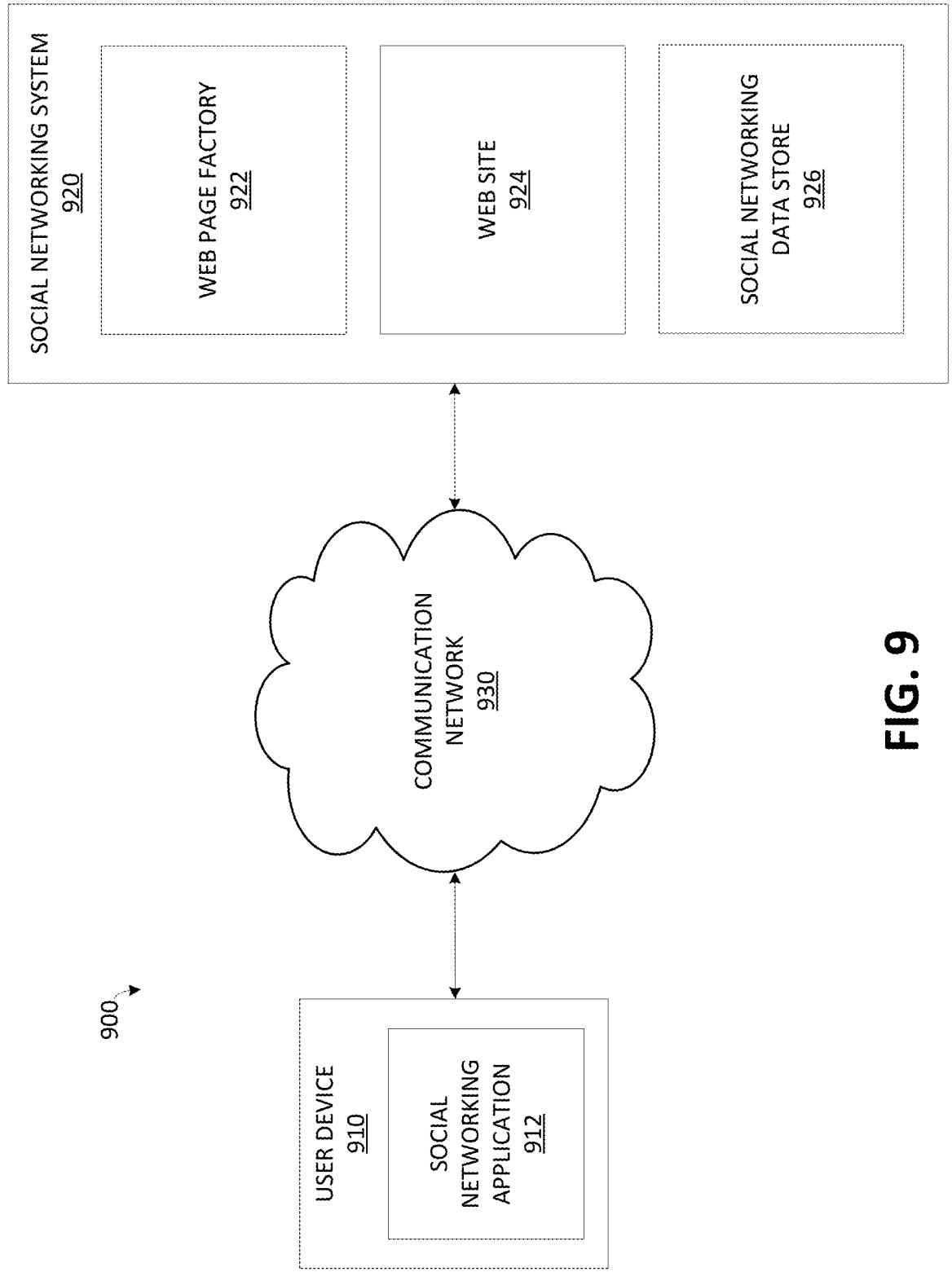
FIG. 9 is a simplified block diagram of an example system that enables a user to access and interact with web pages generated for a taxonomy according to certain embodiments.

FIG. 9 is a simplified block diagram of an example system 900 that enables a user to access and interact with web pages generated for a taxonomy according to certain embodiments. Distributed system 900 may include one or more systems including a social networking system (SNS) 920 communicatively coupled with one or more user devices (e.g., user device 910). In certain embodiments, the one or more user devices may be communicatively coupled with SNS 920 via one or more communication networks (e.g., communication network 930). Examples of communication networks include, without restriction, the Internet, a wide area network (WAN), a local area network (LAN), an Ethernet network, wireless wide-area networks (WWANs), wireless local area networks (WLANs), wireless personal area networks (WPANs), a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, InfiniBand, RoCE, Fiber Channel, Ethernet, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), and others. A WWAN may be a network using an air interface technology, such as, a code division multiple access (CDMA) network, a Time Division Multiple Access (TDMA) network, a Frequency Division Multiple Access (FDMA) network, an OFDMA network, a Single-Carrier Frequency Division Multiple Access (SC-FDMA) network, a WiMax (IEEE 802.16), and so on. A WLAN may include an IEEE 802.11x network (e.g., a Wi-Fi network). A WPAN may be a Bluetooth network, an IEEE 802.15x, or some other types of network.

System 900 depicted in FIG. 9 is merely an example and is not intended to unduly limit the scope of inventive embodiments recited in the claims. One of ordinary skill in the art would recognize many possible variations, alternatives, and modifications. For example, in some implementations, system 900 may have more or fewer systems than those shown in FIG. 9, may combine two or more systems, or may have a different configuration or arrangement of systems.

User device 910 may sometimes be referred to as a client device, or simply a client. User device 910 may be a computing device, such as, for example, a mobile phone, a smart phone, a personal digital assistant (PDA), a tablet computer, an electronic book (e-book) reader, a gaming console, a laptop computer, a netbook computer, a desktop computer, a thin-client device, a workstation, etc.

One or more applications ("apps"), such as social networking application 912, may be hosted and executed by user device 910. The apps may be web browser-based applications and other types of applications. In the example embodiment depicted in FIG. 9, user device 910 hosts and executes a social networking application 912 that enables a user to interact with SNS 920. For example, a user using user device 910 may log into SNS 920, post content to and share content with other members of SNS 920, access and interact with content and services provided by SNS 920, and the like.

In the embodiment depicted in FIG. 9, taxonomy automation system 922 is part of SNS 920. In such an embodiment, taxonomy automation system 922 may receive a taxonomy specification as input from a user device 910. For example, a user of user device 910 may communicate a taxonomy specification defining a taxonomy for a particular domain as input to SNS 920. In response, taxonomy automation system 922 may implement the taxonomy, identify content from SNS data store 924 that is relevant to the concepts of the taxonomy, and generate a set of web pages for accessing and navigating the content. These web pages may be stored as a web site 924 that is hosted by SNS 920. SNS 920 may then allow its members (or even non-members) to access the web pages via the website. For example, a user using a user device such as user device 910 may access these web pages.

In the manner described above, an infrastructure is provided that automatically implements a fully functional taxonomy based upon a taxonomy specification. In response to receiving a taxonomy specification defining a particular taxonomy as input, the infrastructure is able to automatically generate and populate data structures for implementing the taxonomy, determine content that is relevant to different concepts of the taxonomy, and generate an interface that enables users to access and navigate through the taxonomy-related content and the concepts. In certain embodiments, the relevant content may be identified from content stored by a SNS. The only input that is needed is thus the provision of the taxonomy specification—the other steps for implementing the taxonomy are all automated. This level of automation expands the ability of non-technical users to use taxonomies.

Further, the same infrastructure (e.g., taxonomy automation system 120 depicted in FIG. 1) is capable of implementing different taxonomies based upon receiving their specifications. For example, a first user may provide as input to taxonomy automation system 120 a first taxonomy specification for a first taxonomy related to a first domain. In response, taxonomy automation system 120 is configured to generate and populate a first set of structures for implementing the first taxonomy, determine content that is relevant to different concepts of the first taxonomy, and generate a first set of web pages that enables users to access and navigate through the first taxonomy-related content and concepts. A second user may provide as input to taxonomy automation system 120 a second taxonomy specification for a second taxonomy related to a second domain that is different from the first domain. In response, the same taxonomy automation system 120 is able to generate and populate a second set of structures for implementing the second taxonomy, determine content that is relevant to different concepts of the second taxonomy, and generate a second set of web pages that enables users to access and navigate through the second taxonomy-related content and concepts. In this manner, a single common system is provided for implementing multiple different taxonomies. The single common system automatically generates the back-end data structure and determines relevant content for the taxonomy and also generates the front-end interface (e.g., web pages) for accessing and navigating through the taxonomy content and concepts.

Figure 10:
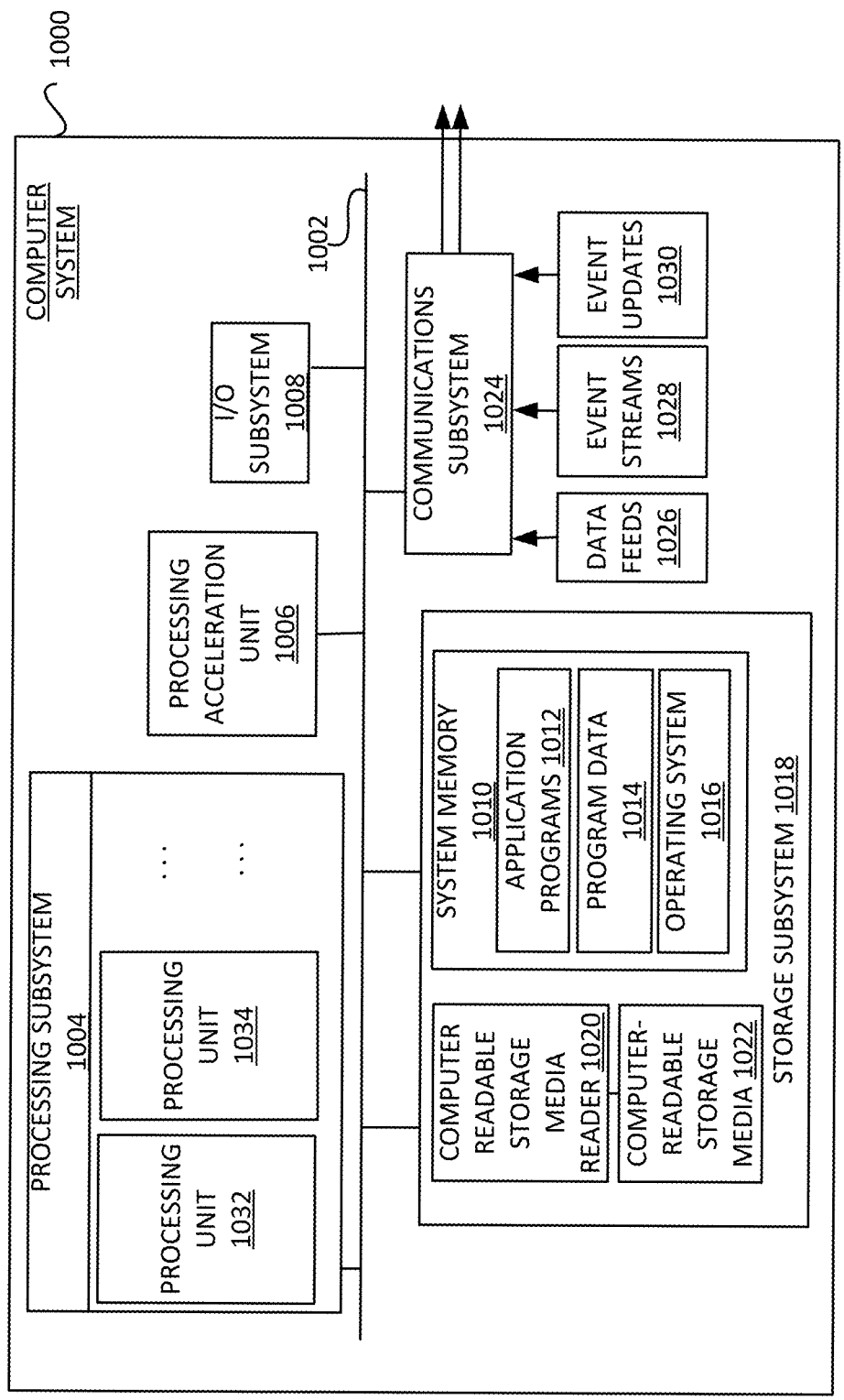
FIG. 10 illustrates an exemplary computer system that may be used to implement certain embodiments described herein.

FIG. 10 illustrates an exemplary computer system 1000 that may be used to implement certain embodiments described herein. For example, in some embodiments, computer system 1000 may be used to implement any of the systems, servers, devices, or the like described above. As shown in FIG. 10, computer system 1000 includes various subsystems including a processing subsystem 1004 that communicates with a number of other subsystems via a bus subsystem 1002. These other subsystems may include a processing acceleration unit 1006, a I/O subsystem 1008, a storage subsystem 1018, and a communications subsystem 1024. Storage subsystem 1018 may include non-transitory computer-readable storage media including storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processors, application specific integrated circuits (ASICs), or field programmable gate arrays (FPGAs). The processors may include be single core or multicore processors. The processing resources of computer system 1000 can be organized into one or more processing units 1032, 1034, etc. A processing unit may include one or more processors, one or more cores from the same or different processors, a combination of cores and processors, or other combinations of cores and processors. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities described above. In instances where computer system 1000 is executing one or more virtual machines, one or more processing units may be allocated to each virtual machine.

In certain embodiments, a processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1000 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some embodiments. Storage subsystem 1018 may store software (e.g., programs, code modules, instructions) that when executed by processing subsystem 1004 provides the functionality described above. The software may be executed by one or more processing units of processing subsystem 1004. Storage subsystem 1018 may also provide a repository for storing data used in accordance with the teachings of this disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1022 may store programming and data constructs that provide the functionality of some embodiments. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1018 may also include a computer-readable storage media reader 1020 that can further be connected to computer-readable storage media 1022. Reader 1020 may receive and be configured to read data from a memory device such as a disk, a flash drive, etc.

In certain embodiments, computer system 1000 may support virtualization technologies, including but not limited to virtualization of processing and memory resources. For example, computer system 1000 may provide support for executing one or more virtual machines. In certain embodiments, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. For example, when computer system 1000 is used to implement storage controller system 106 depicted in FIG. 1, the communication subsystem may be used to communicate with an application system and also a system executing a storage virtual machine selected for an application.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Some embodiments described herein make use of social networking data that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented as a computer program product containing computer program code or instructions executable by one or more processors for performing any or all of the steps, operations, or processes described in this disclosure, where the computer program may be stored on a non-transitory computer readable medium. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
receiving, by a computing system as input from a user, a taxonomy specification for a taxonomy, wherein the taxonomy specification comprises a plurality of concepts included in the taxonomy, a plurality of keywords associated with the plurality of concepts, and hierarchical relationships between the plurality of concepts;
generating, by the computing system, based on the taxonomy specification, a hierarchal taxonomy structure for the taxonomy, wherein the hierarchical taxonomy structure comprises:
a plurality of taxonomy nodes corresponding to the plurality of concepts; and
a hierarchical relationship between the plurality of taxonomy nodes, wherein the hierarchical relationship between the plurality of taxonomy nodes is based on the hierarchical relationship between the corresponding plurality of concepts provided by the taxonomy specification;
for each taxonomy node included in the plurality of taxonomy nodes:
determining, by the computing system, a set of one or more keywords;
associating, by the computing system, the set of one or more keywords with the taxonomy node;
causing, by the computing system, content stored in a network system to be searched using the set of one or more keywords associated with the taxonomy node to identify content relevant to the taxonomy node; and
associating, by the computing system, the relevant content with the taxonomy node; and
building a plurality of web pages for the plurality of taxonomy nodes in the hierarchical taxonomy structure, each of the plurality of web pages including at least a portion of the relevant content associated with the respective taxonomy node, the plurality of web pages comprising a first web page for a parent taxonomy node of the plurality of taxonomy nodes in the hierarchical taxonomy structure, the first web page and the rest of the plurality of web pages including content associated with, respectively, the parent taxonomy node and a plurality of child taxonomy nodes of the hierarchical taxonomy structure, each of the plurality of web pages further including a set of one or more links for accessing one or more other web pages from the plurality of web pages,
wherein the one or more links included in each web page is based on a hierarchical relationship between a taxonomy node of the web page and one or more taxonomy nodes of the one or more other web pages in the hierarchical taxonomy structure.

2. The method of claim 1, wherein the search of the content stored in the network system is performed by a search engine of the network system.

3. The method of claim 1, wherein the taxonomy is associated with a domain.

4. The method of claim 1, wherein a first taxonomy node is a child of a second taxonomy node, and wherein a web page for the first taxonomy node includes a link to a web page for the second taxonomy node.

5. The method of claim 1, further comprising:
identifying, from the hierarchical taxonomy structure, a first keyword associated with a first concept in the plurality of concepts;
identifying, a second keyword using the first keyword; and
associating the first keyword and the second keyword with a taxonomy node in the plurality of taxonomy nodes corresponding to the first concept.

6. The method of claim 5, wherein identifying the second keyword comprises:
determining the second keyword based on a set of one or more documents returned in response to a search performed using the first keyword.

7. The method of claim 1, further comprising:
sending information to a user, the information enabling the user to access the plurality of web pages.

8. The method of claim 1, further comprising:
receiving, by the computing system, a second taxonomy specification for a second taxonomy, the second taxonomy specification identifying a plurality of second concepts included in the second taxonomy, a plurality of keywords associated with the plurality of second concepts, and hierarchical relationships between the plurality of second concepts;
generating, by the computing system, based on the second taxonomy specification, a second hierarchical taxonomy structure for the second taxonomy, the second hierarchical taxonomy structure comprising a plurality of second taxonomy nodes corresponding to the plurality of second concepts, a hierarchical relationship between the plurality of second taxonomy nodes being based on the hierarchical relationship between the corresponding plurality of second concepts; and
building a plurality of second web pages for the plurality of second taxonomy nodes in the second hierarchical taxonomy structure, the plurality of second web pages comprising a second web page for a second parent taxonomy node of the plurality of second taxonomy nodes of the second hierarchical taxonomy structure, the second web page and the rest of the plurality of second web pages including content associated with, respectively, the second parent taxonomy node and a plurality of second child taxonomy nodes of the second hierarchical taxonomy structure, each of the plurality of second web pages comprising a set of one or more links for accessing one or more other web pages from the plurality of second web pages,
wherein the one or more links included in each web page is based on a hierarchical relationship between a taxonomy node of the web page and one or more taxonomy nodes of the one or more other web pages in the second hierarchical taxonomy structure.

9. The method of claim 1, wherein the plurality of web pages are updated periodically based on additional searches using the set of one or more keywords.

10. A non-transitory computer-readable storage medium storing a plurality of instructions executable by one or more processors, the plurality of instructions when executed by the one or more processors cause the one or more processors to:
receive, as input from a user, a taxonomy specification for a taxonomy, wherein the taxonomy specification comprises a plurality of concepts included in the taxonomy, a plurality of keywords associated with the plurality of concepts, and hierarchical relationships between the plurality of concepts;

generating based on the taxonomy specification, a hierarchal taxonomy structure for the taxonomy, wherein the hierarchical taxonomy structure comprises:
- a plurality of taxonomy nodes corresponding to the plurality of concepts; and
- a hierarchical relationship between the plurality of taxonomy nodes, wherein the hierarchical relationship between the plurality of taxonomy nodes is based on the hierarchical relationship between the corresponding plurality of concepts provided by the taxonomy specification;

for each taxonomy node included in the plurality of taxonomy nodes:
- determine a set of one or more keywords;
- associate the set of one or more keywords with the taxonomy node;
- cause content stored in a network system to be searched using the set of one or more keywords associated with the taxonomy node to identify content relevant to the taxonomy node; and
- associate the relevant content with the taxonomy node; and build a plurality of web pages for the plurality of taxonomy nodes in the hierarchical taxonomy structure, each of the plurality of web pages including at least a portion of the relevant content associated with the respective taxonomy node, the plurality of web pages comprising a first web page for a parent taxonomy node of the plurality of taxonomy nodes in the hierarchical taxonomy structure, the first web page and the rest of the plurality of web pages including content associated with, respectively, the parent taxonomy node and a plurality of child taxonomy nodes of the hierarchical taxonomy structure, each of the plurality of web pages further including a set of one or more links for accessing one or more other web pages from the plurality of web pages, wherein the one or more links included in each web page is based on a hierarchical relationship between a taxonomy node of the web page and one or more taxonomy nodes of the one or more other web pages in the hierarchical taxonomy structure.

11. The non-transitory computer-readable storage medium of claim 10, wherein the search of the content stored in the network system is performed by a search engine of the network system.

12. The non-transitory computer-readable storage medium of claim 10, wherein the taxonomy is associated with a domain.

13. The non-transitory computer-readable storage medium of claim 10, wherein a first taxonomy node is a child of a second taxonomy node, and wherein a web page for the first taxonomy node includes a link to a web page for the second taxonomy node.

14. The non-transitory computer-readable storage medium of claim 10, wherein the plurality of instructions when executed by the one or more processor further cause the one or more processors to:
- identify, from the hierarchical taxonomy structure, a first keyword associated with a first concept in the plurality of concepts;
- identify, a second keyword using the first keyword; and
- associate the first keyword and the second keyword with a taxonomy node in the plurality of taxonomy nodes corresponding to the first concept.

15. The non-transitory computer-readable storage medium of claim 14, wherein identifying the second keyword comprises:
- determining the second keyword based on a set of one or more documents returned in response to a search performed using the first keyword.

16. The non-transitory computer-readable storage medium of claim 10, wherein the plurality of web pages are updated periodically based on additional searches using the set of one or more keywords.

17. A system comprising:
- one or more processors; and
- a non-transitory computer-readable medium including instructions that, when executed by the one or more processors, cause the one or more processors to:
  - receive, as input from a user, a taxonomy specification for a taxonomy, wherein the taxonomy specification comprises a plurality of concepts included in the taxonomy, a plurality of keywords associated with the plurality of concepts, and hierarchical relationships between the plurality of concepts;
  - generate, based on the taxonomy specification, a hierarchal taxonomy structure for the taxonomy, wherein the hierarchical taxonomy structure comprises:
    - a plurality of taxonomy nodes corresponding to the plurality of concepts; and
    - a hierarchical relationship between the plurality of taxonomy nodes, wherein the hierarchical relationship between the plurality of taxonomy nodes is based on the hierarchical relationship between the corresponding plurality of concepts provided by the taxonomy specification;
  - for each taxonomy node included in the plurality of taxonomy nodes:
    - determine a set of one or more keywords;
    - associate the set of one or more keywords with the taxonomy node;
    - cause content stored in a network system to be searched using the set of one or more keywords associated with the taxonomy node to identify content relevant to the taxonomy node; and
    - associate the relevant content with the taxonomy node; and
  - build a plurality of web pages for the plurality of taxonomy nodes in the hierarchical taxonomy structure, each of the plurality of web pages including at least a portion of the relevant content associated with the respective taxonomy node, the plurality of web pages comprising a first web page for a parent taxonomy node of the plurality of taxonomy nodes in the hierarchical taxonomy structure, the first web page and the rest of the plurality of web pages including content associated with, respectively, the parent taxonomy node and a plurality of child taxonomy nodes of the hierarchical taxonomy structure, each of the plurality of web pages further including a set of one or more links for accessing one or more other web pages from the plurality of web pages,
  - wherein the one or more links included in each web page is based on a hierarchical relationship between a taxonomy node of the web page and one or more taxonomy nodes of the other web pages in the hierarchical taxonomy structure.

18. The system of claim 17, wherein the search of the content stored in the network system is performed by a search engine of the network system.

19. The method of claim 1, wherein the parent taxonomy node is a root taxonomy node in the hierarchical taxonomy structure.

* * * * *